US007382983B2

(12) United States Patent
Mizuma et al.

(10) Patent No.: US 7,382,983 B2
(45) Date of Patent: Jun. 3, 2008

(54) OPTICAL CONTROL TYPE PHASED ARRAY ANTENNA

(75) Inventors: Masashi Mizuma, Tokyo (JP); Toshiyuki Ando, Tokyo (JP); Tomohiro Akiyama, Tokyo (JP); Yoshihito Hirano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 519 days.

(21) Appl. No.: 10/533,181

(22) PCT Filed: May 29, 2003

(86) PCT No.: PCT/JP03/06761

§ 371 (c)(1), (2), (4) Date: Apr. 28, 2005

(87) PCT Pub. No.: WO2004/107567

PCT Pub. Date: Dec. 9, 2004

(65) Prior Publication Data

US 2006/0012519 A1 Jan. 19, 2006

(51) Int. Cl.
*H04B 10/00* (2006.01)
*H04B 10/12* (2006.01)
*H04B 10/04* (2006.01)
*H01Q 1/06* (2006.01)

(52) U.S. Cl. ....................... 398/115; 398/116; 398/141; 398/188; 342/368; 343/721; 343/893

(58) Field of Classification Search ........ 398/115–116, 398/140–141, 151, 153, 159, 187–188, 198; 342/368, 200; 343/721, 724, 824, 893
See application file for complete search history.

(56) References Cited

U.S. PATENT DOCUMENTS 4,739,334 A 4/1988 Soref (Continued)

FOREIGN PATENT DOCUMENTS

JP 1-212004 A 8/1989

(Continued)

OTHER PUBLICATIONS

Anderson et al., NASA Contractor Report, (Online), No. NASA-CRz-180844, Jun. 1, 1987, (XP002453502). Washington, DC, USA, Retrieved from the Internet: URL: http://Hdl.handle.net/2060/19900001894.

*Primary Examiner*—M. R. Sedighian
(74) *Attorney, Agent, or Firm*—Birch, Stewart, Kolasch & Birch, LLP

(57) ABSTRACT

An optical control type phased array antenna includes a laser generating means for generating light of single wavelength, an optical path branching means for branching the light emitted from the laser generating means into first and second transmission lights, a high frequency signal generating means for generating a high frequency signal, an optical frequency modulating means for shifting the frequency of the first transmission light branched by the optical path branching means by the frequency of a high frequency signal thus generated, a spatial light phase modulating means performing spatial phase modulation of the first transmission light shifted by the frequency of a high frequency signal depending on the antenna beam pattern, and an optical path branching/multiplexing means for multiplexing the first transmission light subjected to phase modulation and the second transmission light branched by the optical path branching means. Optical path lengths of two paths between the optical path branching means and the optical path branching/multiplexing means are equalized.

4 Claims, 9 Drawing Sheets

U.S. PATENT DOCUMENTS

| | | | | |
|---|---|---|---|---|
| 5,333,000 | A * | 7/1994 | Hietala et al. | 342/368 |
| 5,412,474 | A | 5/1995 | Reasenberg et al. | |
| 6,674,969 | B1 * | 1/2004 | Ogusu | 398/79 |
| 2002/0012495 | A1 * | 1/2002 | Sasai et al. | 385/24 |

FOREIGN PATENT DOCUMENTS

| | | | |
|---|---|---|---|
| JP | 3-57305 | A | 3/1991 |
| JP | 6-276017 | A | 9/1994 |
| JP | 9-307336 | A | 11/1997 |
| JP | 2002-208813 | A | 7/2002 |
| WO | WO-2005/004324 | A1 | 1/2005 |

* cited by examiner

BEFORE CHANGE OF
BEAM SCANNING DIRECTION

AFTER CHANGE OF
BEAM SCANNING DIRECTION

BEFORE CHANGE OF
BEAM SCANNING DIRECTION

AFTER CHANGE OF
BEAM SCANNING DIRECTION

OPTICAL CONTROL TYPE PHASED ARRAY ANTENNA

TECHNICAL FIELD

The present invention relates to an optical control type phased array antenna (PAA) capable of suppressing a phase noise and a relative intensity noise.

BACKGROUND ART

A conventional optical control type phased array antenna includes signal generating means for outputting one electrical signal corresponding to an inputted beam direction of a phased array antenna, and a plurality of phase shifting means for phase-shifting a plurality of first optical signals outputted from second distribution means by phase amounts which correspond to the electrical signal and which are different from one another. Thus, a circuit can be simplified to be reduced in size and weight, and hence the whole phased array antenna including the circuit can be reduced in size and weight (refer to JP-A 3-57305 (page 9 and FIG. 1) for example).

However, there is encountered a problem in that measures for suppressing a phase noise and a relative intensity noise of a light source itself are not taken in the above-mentioned conventional optical control type phased array antenna.

The present invention has been made in order to solve the above-mentioned problem. It is, therefore, an object of the present invention to obtain an optical control type phased array antenna capable of suppressing phase noises including: a phase noise generated by phase fluctuation of a light source itself; a phase noise generated by an optical length change resulting from a change of a refractive index of the atmosphere due to a disturbance such as a temperature fluctuation in a space in a case where a spatial transmission line is used as transmission means; a phase noise generated by a change in beam scanning direction; and a relative intensity noise of the light source.

DISCLUSURE OF THE INVENTION

According to the present invention, an optical control type phased array antenna includes: laser generating means for generating a light having a single wavelength; optical path branching means for branching the emitted light from the laser generating means into first and second transmission lights; high frequency signal generating means for generating a high frequency signal; optical frequency modulating means for shifting a frequency of the first transmission light obtained through the branching by the optical path branching means by a frequency of the generated high frequency signal; spatial light phase modulating means for carrying out spatial phase modulation corresponding to an antenna beam pattern for the first transmission light having the frequency shifted by the frequency of the generated high frequency signal; and optical path branching/multiplexing means for multiplexing the first transmission light subjected to the phase modulation and the second transmission light obtained through the branching by the optical path branching means.

Moreover, the optical control type phased array antenna further includes: aperture dividing/light collecting means for dividing the transmission light obtained through the multiplexing by the optical path branching/multiplexing means into a plurality of transmission lights; a plurality of optoelectronic converting means for converting light intensities of the plurality of transmission lights into electrical signals, respectively; and a plurality of element antennas for radiating the electrical signals from the plurality of optoelectronic converting means in the form of beams, respectively.

Then, optical path lengths of two paths between the optical path branching means and the optical path branching/multiplexing means are equalized.

BEST MODE FOR CARRYING OUT THE INVENTION

Embodiments of the present invention will hereinafter be described based on the accompanying drawings.

Embodiment 1

Figure 1:
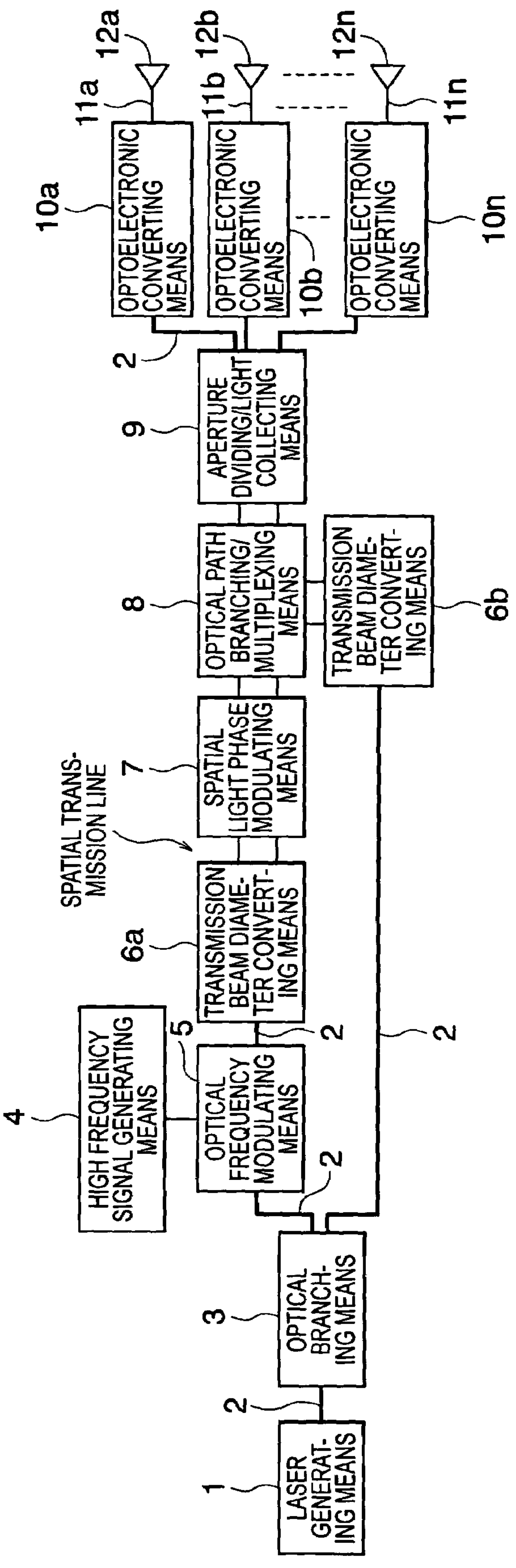
FIG. 1 is a block diagram showing a configuration of an optical control type phased array antenna according to Embodiment 1 of the present invention.

An optical control type phased array antenna according to Embodiment 1 of the present invention will now be described with reference to the corresponding drawings. FIG. 1 is a block diagram showing a configuration of an optical control type phased array antenna according to Embodiment 1 of the present invention. Note that in FIG. 1, the same reference symbols designate the same or corresponding constituent elements.

In FIG. 1, the optical control type phased array antenna includes: laser generating means 1 for generating a light having a single wavelength to output the generated light through an optical fiber; optical fiber type transmitting means (corresponding to portions indicated by heavy lines) for transmitting the light outputted by the laser generating means 1; optical path branching means 3 for branching the light transmitted through the optical fiber type transmitting means 2 and for allowing a branching ratio to be freely changed; high frequency signal generating means 4 adapted to oscillate at a single frequency; optical frequency modulating means 5 for shifting a frequency of the transmission light by the frequency of a high frequency signal inputted thereto from the high frequency signal generating means 4 to output the resultant transmission light; transmission beam diameter converting means 6*a* and 6*b* for changing a transmission line from the optical fiber type transmission means 2 to transmission means other than the optical fiber; spatial light phase modulating means 7 for carrying out collectively spatial phase modulation corresponding to an antenna beam pattern for the transmission light transmitted through the optical fiber type transmitting means 2; optical path branching/multiplexing means 8 capable of branching or multiplexing the transmission light transmitted through the spatial transmission line; aperture dividing/light collecting means 9 for changing a transmission style for the transmission light from the spatial transmission to the optical fiber type transmission and for dividing the transmission light into a plurality of transmission lights; optoelectronic converting means 10*a*, 10*b* to 10*n* for converting light intensities of the transmission lights transmitted through the optical fiber type transmission means 2 into electrical signals, respectively, to amplify the resultant electrical signals up to a desired voltage level; feeder lines 11*a*, 11*b* to 11*n* having one ends connected to output portions of the optoelectronic converting means 10*a*, 10*b* to 10*n*, respectively; and element antennas 12*a*, 12*b* to 12*n* connected to the other ends of the feeder lines 11*a*, 11*b* to 11*n*, respectively.

In addition, optical path lengths of the two transmission lights obtained through the two-branching from the optical path branching means 3 to the optical path branching/multiplexing means 8 are equalized.

Note that spatial transmission lines (corresponding to portions indicated by two fine lines) extend between the transmission beams diameter converting means 6*a* and 6*b*, and the aperture dividing/light collecting means 9.

Next, an operation of the optical control type phased array antenna according to Embodiment 1 will be described with reference to the corresponding drawings.

First of all, a laser beam is outputted from the laser generating means 1 to be transmitted through the optical fiber type transmitting means 2. The transmission light is then branched into transmission lights for two paths by the optical path branching means 3. Here, a frequency of each of the transmission lights to be transmitted through the two paths, respectively, is assigned $f_c$.

One transmission light (signal light) obtained through the two-branching by the optical branching means 3 becomes a signal (its frequency is $f_c+f_{RF}$) a frequency of which is shifted by an oscillation frequency $f_{RF}$ provided by the high frequency signal generating means 4 through the high frequency signal generating means 4 and the optical frequency modulating means 5. Moreover, a transmission path of the transmission light is changed from the optical fiber type transmission means 2 to transmission means (a spatial transmission line in this example) other than the optical fiber by the transmission beam diameter converting means 6*a*. Also, the spatial phase modulation corresponding to a desired antenna pattern is carried out for the transmission light by the spatial light phase modulating means 7.

On the other hand, a transmission path of the other transmission light (local light) obtained through the two-branching by the optical path branching means 3 is changed from the optical fiber type transmitting means 2 to transmission means (a spatial transmission line in this example) other than the optical fiber through the transmission beam converting means 6*b*.

The signal light and the local light are multiplexed by the optical path branching/multiplexing means 8, and a transmission style of the resultant transmission light is changed to optical fiber type transmission again. Moreover, the transmission light obtained through the multiplexing is divided into a plurality of transmission lights which are in turn converted into electrical signals by n (n: natural number) optoelectronic converting means 10*a* to 10*n* and are then amplified up to a desired voltage level. When a detector to output a signal having a frequency difference between the signal light and the local light is used in each of the optoelectronic converting means 10*a* to 10*n*, a frequency of a signal outputted from the detector becomes $(f_c+f_{RF})-f_c=f_{RF}$. Thus, the frequency $f_c$ of the transmission light can be excluded. Radio signals each having the frequency $f_{RF}$ are fed to the element antennas 12*a* to 12*n* through n feeder lines 11*a* to 11*n*, respectively.

In a configuration of FIG. 1, optical path lengths of the two paths of the signal light and the local light are assigned $L_1$ and $L_2$, respectively. The optical path lengths of the two paths include the intraoptical-fiber transmission means and the extraoptical-fiber transmission means (spatial transmission line) from the optical path branching means 3 by which the transmission light is branched to the optical path branching/multiplexing means 8 by which the resultant transmission lights are multiplexed.

Here, when $|L_1-L_2|=\Delta L$ and $\tau=n\Delta L/c$ (where n represents a refractive index of a transmission line medium, and c is the light velocity) are established, a relationship between $\tau$ and a spectrum $S_d(f)$ of an output signal from the detector is expressed by Equation (1) (reference literature: "COHERENT OPTICAL COMMUNICATION ENGINEERING", by Okoshi and Kikuchi, pp. 90 to 94). Note that $\delta f$ represents a line width of the light source (the laser generating means 1):

$$S_d(f) = \exp(-2\pi\delta f\tau)\delta(f) + \frac{\delta f}{\pi\{f^2+(\delta f^2)\}}\left\{1-\exp(-2\pi\delta f\tau)\times\left(\cos 2\pi f\tau - \frac{f}{2\delta f}\sin 2\pi f\tau\right)\right\} - \frac{1}{2\pi^2 f}\exp(-2\pi\delta f\tau)\sin 2\pi f\tau \quad (1)$$

When ΔL is made close to zero in Equation (1), a first term (signal spectrum component) of Equation (1) becomes dominant to terms in and after a second term (noise spectrum component), and hence a measured output spectrum has a sharp peak. For example, when δf=3.2 MHz and an offset frequency f=2 MHz are substituted for Equation (1), if the fiber length is adjusted so as to meet ΔL=1 μm, 142 dB can be obtained as an SNR (a ratio of the first term to the terms in and after the second term in Equation (1)) in $S_d(f)$.

Figure 2:
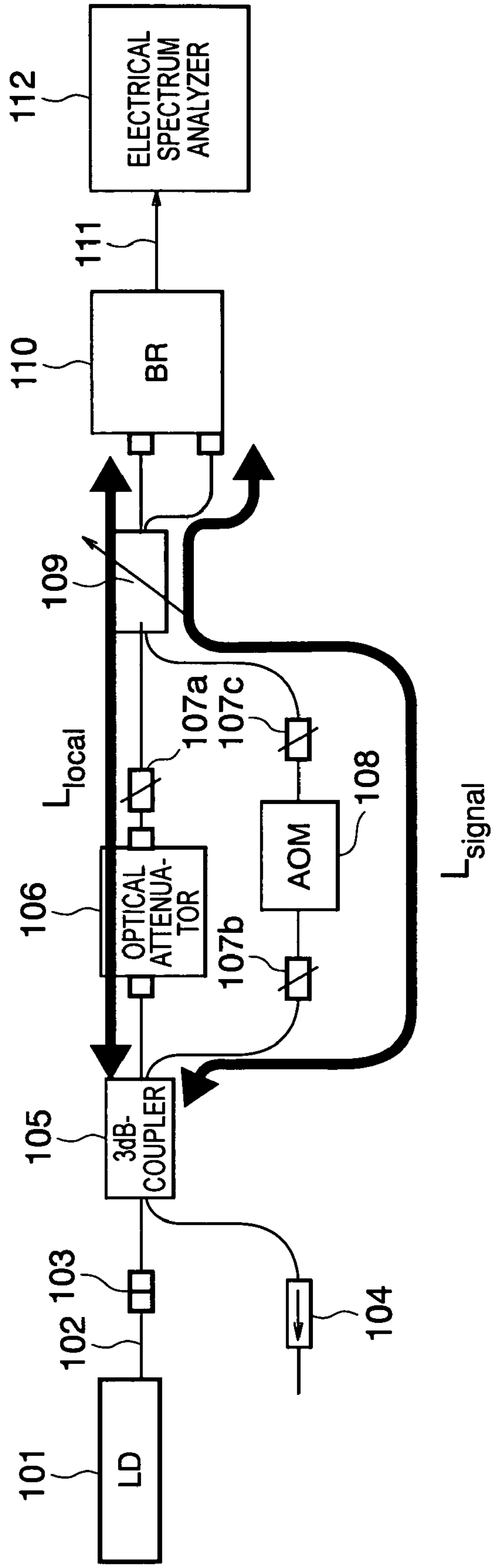
FIG. 2 is a block diagram showing a configuration of an experimental system of the optical control type phased array antenna according to Embodiment 1 of the present invention.

In addition, an experimental system as shown in FIG. 2 was configured and measurements of suppression of a phase noise were carried out.

In FIG. 2, this experimental system includes: a semiconductor laser (LD) 101; a polarization surface preserving optical fiber 102; an optical connector (FC-PC) 103; an optical isolator 104; a 3 dB-coupler 105; an optical attenuator 106; optical connectors (FC-Angled PC) 107*a* to 107*c*; an acousto-optic modulator (AOM) 108; a variable coupler 109; balanced receiver means (BR) 110 having two photodiodes ($PD_1$ and $PD_2$); a transmission line 111; and an electrical spectrum analyzer 112.

Next, an operation of the experimental system will be described. A light outputted from the semiconductor laser (LD) 101 is branched into two transmission lights using the 3 dB-coupler 105. One transmission light is used as a local light in a heterodyne detection system, and is made incident to the variable coupler 109 after being attenuated in the optical attenuator 106. The other transmission light is used as a signal light in the heterodyne detection system. Thus, the other transmission light is made incident to the variable coupler 109 after being frequency-modulated at 50 MHz using the acousto-optic modulator (AOM) 108.

Moreover, two output lights after the local light and the signal light are multiplexed in the variable coupler 109 are made incident to the balanced receiver means (BR) 110 serving as an optoelectronic converter, and a spectrum of an output signal from the balanced receiver means (BR) 110 is measured with the electrical spectrum analyzer 112. Here, an optical path length of the transmission light outputted from one output port of the 3 dB-coupler 105 to the balanced receiver means (BR) 110, to which the transmission light passes through the optical attenuator 106 and the variable coupler 109 to be made incident, is assigned $L_{local}$. An optical path length of the other transmission light outputted from the other port of the 3 dB-coupler 105 to the balanced receiver means (BR) 110, to which the other transmission light passes through the acousto-optic modulator (AOM) 108 and the variable coupler 109 to be made incident, is assigned $L_{signal}$. In the measurements, the output spectra were measured under a condition in which the fiber lengths were adjusted so that the two optical path lengths, $L_{local}$ and $L_{signal}$, were equalized.

Figure 3:
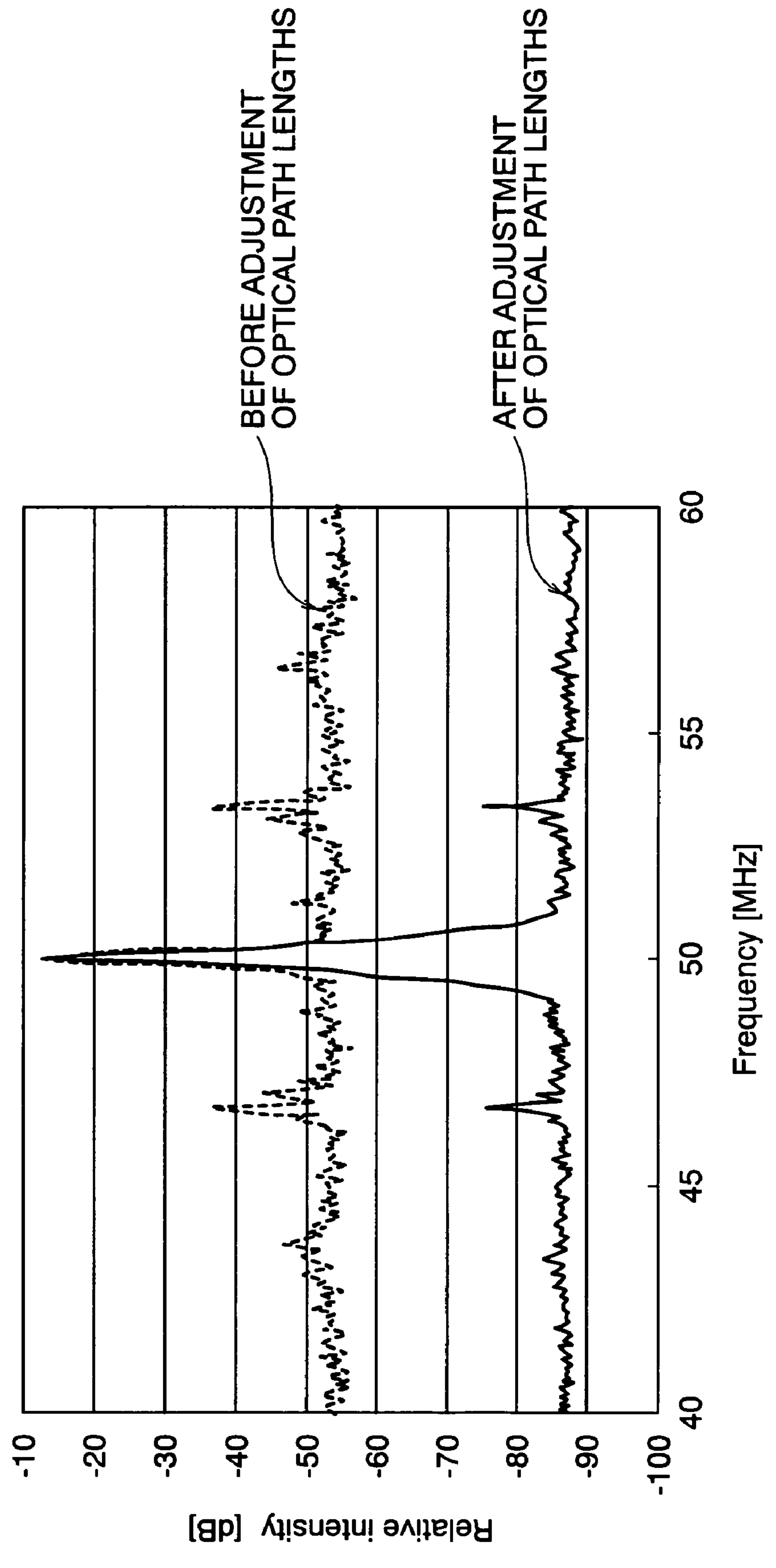
FIG. 3 is a graphical representation showing an output spectrum before an adjustment of an optical path length and an output spectrum after the adjustment of the optical path length in the experimental system of the optical control type phased array antenna according to Embodiment 1 of the present invention.

FIG. 3 shows measurement results of the optical spectrum before the adjustment of the optical lengths and the optical spectrum after the adjustment of the optical lengths. As shown in FIG. 3, though before the adjustment of the optical path lengths of 92 dB/Hz was obtained in terms of an SNR per 1 Hz as the SNR in offset of 2 MHz, after the adjustment of the optical path lengths of 120 dB/Hz was obtained as the SNR in offset of 2 MHz. Thus, it was proved from those measurement results that the equalization of the two optical path lengths makes the suppression of the phase noise possible.

In addition, since in Embodiment 1, as shown in FIG. 1, the optical path branching means 3 is used, the suppression of the phase noise using a single light source becomes possible.

As described above, with the configuration in which the optical path lengths of the two transmission lights obtained through the two-branching are equalized for the purpose of carrying out the heterodyne detection, the optical control type PAA has an advantage that the phase noise of the light source itself can be suppressed with a single light source.

Note that while in Embodiment 1, there are some portions in each of which the optical fiber is used as the optical transmission means, the transmission means is not especially limited thereto in the present invention.

Embodiment 2

Figure 4:
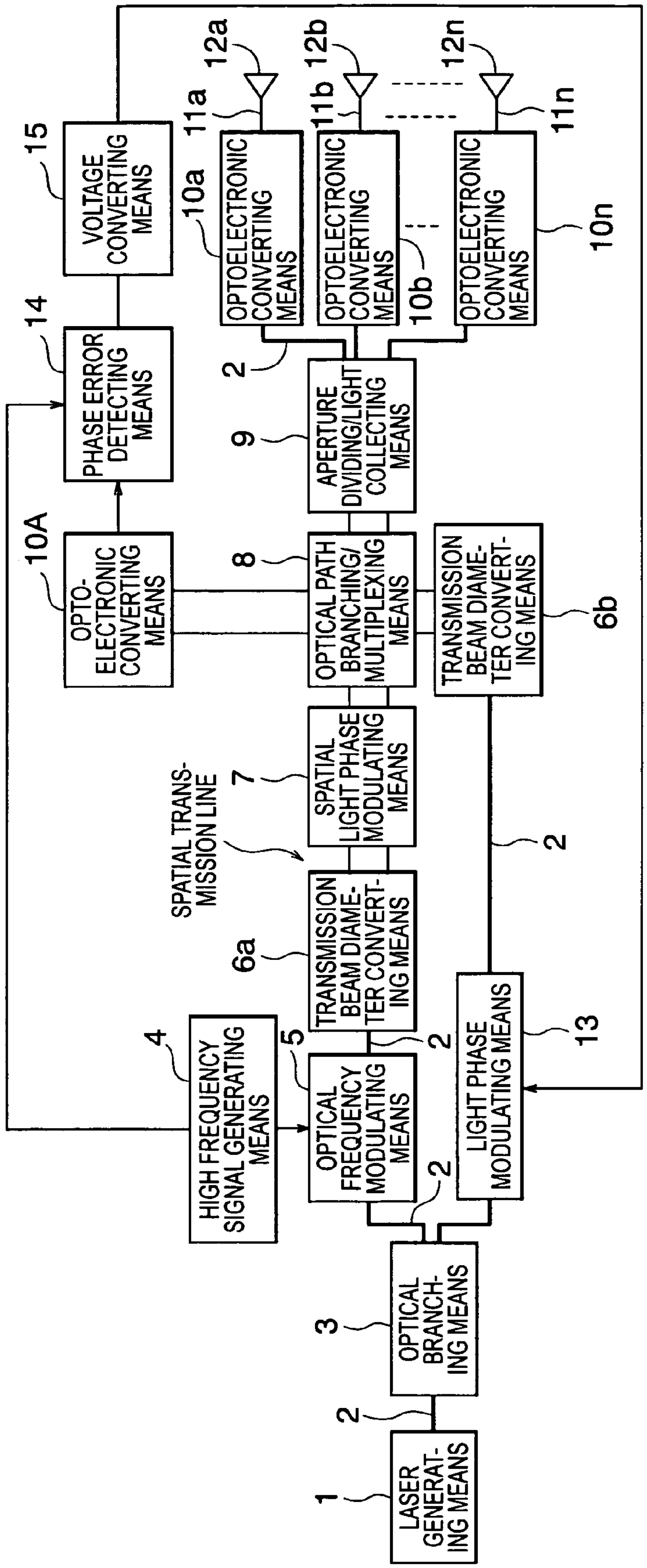
FIG. 4 is a block diagram showing a configuration of an optical control type phased array antenna according to Embodiment 2 of the present invention.

An optical control type phased array antenna according to Embodiment 2 of the present invention will hereinafter be described with reference to the corresponding drawings. FIG. 4 is a block diagram showing a configuration of the optical control type phased array antenna according to Embodiment 2 of the present invention.

In Embodiment 1 described above, in the optical control type PAA, the two optical path lengths of the transmission lights obtained through the two-branching are equalized for the purpose of carrying out the heterodyne detection, thereby realizing the suppression of the phase noise with the single light source. However, when a spatial transmission line is used as the transmission means, the refractive index of the atmosphere changes due to a disturbance such as a temperature change in the space, and hence the optical path length changes. As a result, phase fluctuation is newly caused. In Embodiment 2, the suppression of the phase noise is realized using a phased locked loop (PLL) as measures to solve that problem.

In FIG. 4, the same constituent elements as those in FIG. 1 are designated with the same reference numerals and their description are omitted here.

The optical control type phased array antenna according to Embodiment 2 of the present invention further includes: optoelectronic converting means 10A for converting a light intensity of a transmission light transmitted through the optical fiber type transmitting means 2 into an electrical signal similarly to each of the optoelectronic converting means 10*a* to 10*n*, and for amplifying the resultant electrical signal up to a desired voltage level; light phase modulating means 13 capable of controlling a phase of the transmission light; phase error detecting means 14 for detecting a phase error caused during the transmission of the transmission light; and voltage converting means 15 for setting the electrical signal at a desired voltage level.

Next, an operation of the optical control type phased array antenna according to Embodiment 2 will be described with reference to the corresponding drawings.

An operation different from that of Embodiment 1 described above will now be described. First of all, the light phase modulating means 13 is inserted between the optical path branching means 3 and the transmission beam diameter converting means 6*b* in the transmission line of the local light obtained through the two-branching by the optical path branching means 3. Note that the light phase modulating means 13 may also be inserted in the transmission line of the signal light.

In addition, the transmission light obtained through the multiplexing in the optical path branching/multiplexing means 8 is branched into transmission lights for two paths. One of the transmission lights is supplied to the aperture dividing/light collecting means 9 similarly to the case of FIG. 1, and the other is converted into an electrical signal by the optoelectronic converting means 10A.

The electrical signal obtained through the optoelectronic conversion is supplied to the phase error detecting means 14. The phase error detecting means 14 detects a phase difference between the electrical signal generated from the high frequency signal generating means 4 and the electrical signal from the optoelectronic converting means 10A.

Figure 5:
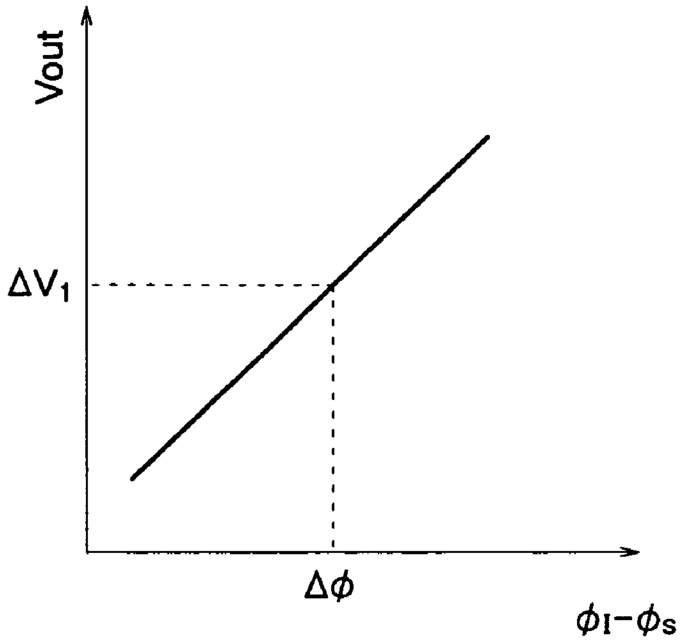
FIG. 5 is a characteristic diagram showing a relationship between a phase difference and an output voltage in phase error detecting means of the optical control type phased array antenna according to Embodiment 2 of the present invention.

Moreover, the phase error detecting means 14 converts the detected phase difference into an electrical signal proportional to the phase difference based on a relationship as shown in FIG. 5 for example to output the resultant electrical signal. Here, a phase of the electrical signal generated from the high frequency signal generating means 4 is assigned $\Phi_S$, a phase of the electrical signal from the optoelectronic converting means 10A is assigned $\Phi_I$, an output voltage from the phase error detecting means 14 is assigned $V_{out}$, and an output voltage from the phase error detecting means 14 corresponding to $\Phi_I-\Phi_S=\Delta\Phi$ is assigned $\Delta V_1$. Note that while the proportional relationship is adopted for the characteristics obtained between the phase difference and the output voltage in order to make the understanding easy, the characteristics obtained between the phase difference and the output voltage are not limited thereto as long as those characteristics are known.

Figure 6:
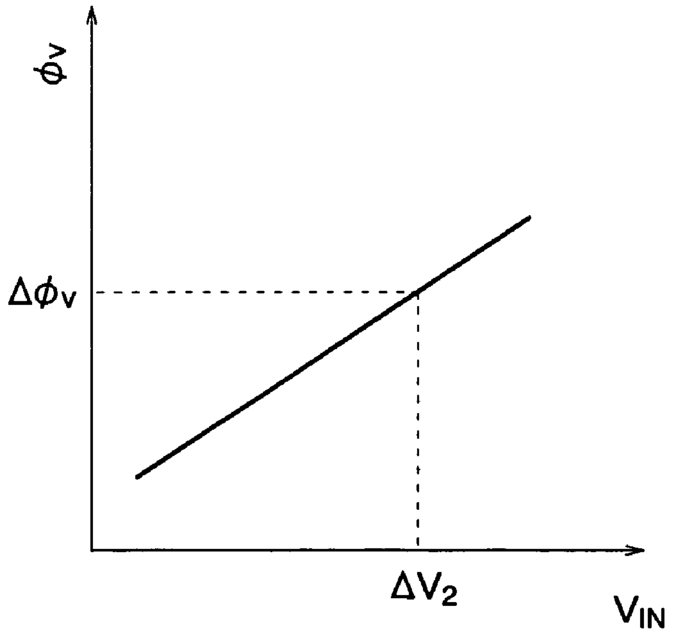
FIG. 6 is a characteristic diagram showing a relationship between an input voltage and a modulated phase in light phase modulating means of the optical control type phased array antenna according to Embodiment 2 of the present invention.

Thereafter, the output voltage from the phase error detecting means 14 is supplied to the light phase modulating means 13 through the voltage converting means 15 to be modulated into a voltage signal having a phase proportional to an input voltage based on a relationship as shown in FIG. 6 for example. Here, the input voltage is assigned $V_{IN}$, a modulation phase is assigned $\Phi_V$, and a modulation phase when a signal having a voltage $\Delta V_2$ is inputted to the light phase modulating means 13 is assigned $\Delta\Phi_V$. Note that while the proportional relationship is adopted for the characteristics obtained between the input voltage and the modulation phase in order to make the understanding easy, the characteristics are not limited thereto as long as those characteristics are known. At this time, there is inserted the voltage converting means 15 for converting the voltage signal from $\Delta V_1$ into $\Delta V_2$ so as to obtain a relationship of $\Delta\Phi=\Delta\Phi_V$. As a result, such a negative feedback circuit as to reduce a phase difference between the electrical signal generated from the high frequency signal generating means 4 and the electrical signal obtained through the optoelectronic conversion of the multiplexed light is formed, and hence it becomes possible to suppress the phase noise caused by the phase fluctuation.

As described above, the optical control type PAA according to Embodiment 2 of the present invention has an advantage that the phase noise caused by the disturbance such as the temperature change in the space can be suppressed.

Note that while in Embodiment 2, there are some portions using the optical fiber as the optical transmission means, the transmission means is not especially limited thereto in the present invention.

Embodiment 3

An optical control type phased array antenna according to Embodiment 3 of the present invention will hereinafter be described with reference to the corresponding drawings.

In the spatial optical phase modulating means 7 shown in FIG. 4, it is possible to change the scanning direction of the beams emitted through the element antennas 12*a* to 12*n*. However, the phase shift due to the different optical path length is caused during that change as well of the beam scanning direction. In a case of a system using the PLL similarly to that of Embodiment 2, the phase difference caused by the beam direction change can also be corrected. Hereinafter, the principles thereof will be described.

Here, the phase fluctuation due to the pattern change in the spatial optical phase modulating means 7 is considered as being identical to the phase fluctuation due to the change of the scanning direction of the beams radiated through the element antennas. Then, the phase fluctuation during the change of the scanning directions of the beams radiated through the element antennas will hereinafter be considered.

The disposition surfaces of the element antennas can be considered based on an azimuth angle direction and an elevation angle direction of the beam scanning directions, and also the azimuth angle direction and the elevation angle direction can be considered independently of each other. Thus, in this case, only the azimuth angle direction of the beam scanning direction is considered.

Figure 7A:
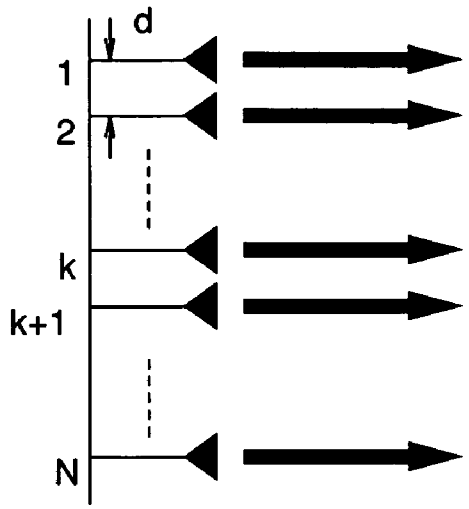
FIG. 7A and FIG. 7B are a schematic diagram showing propagation of beams before a change of a beam scanning direction of element antennas and propagation of the beams after the change of the beam scanning direction of the element antennas in an optical control type phased array antenna according to Embodiment 3 of the present invention.
Figure 7B:
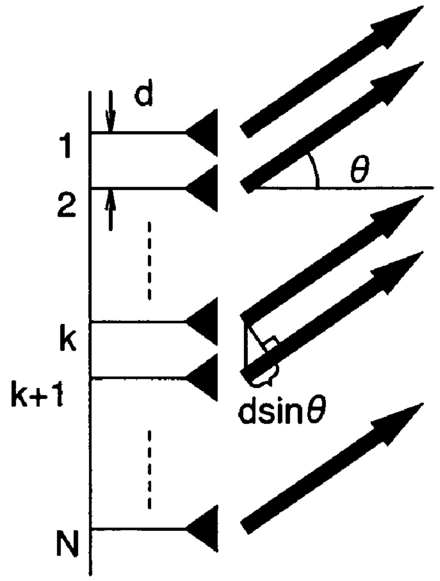

FIG. 7A and FIG. 7B show the arrangement of the element antennas in the azimuth angle direction. Here, an interval of the element antennas is assigned d, and the number of element antennas is assigned N. At this time, when it is supposed that the azimuth angle direction of the beams radiated through the element antennas is changed by an angle θ as shown in FIG. 7B, an optical length difference Δl in azimuth angle direction between the k-th (k=1, 2, . . . , N−1) element antenna and the (k+1)-th element antenna is given by Equation (2):

$$\Delta l=d\sin\theta \tag{2}$$

Here, it is supposed that the element antennas are not discretely disposed, but the beams are radiated from a continuous plane having a length of d×N for generality. In this case as well, since the azimuth angle direction and the elevation angle direction of the beams may also be considered independently of each other as described above, only the azimuth angle direction is considered below.

Figure 8A:
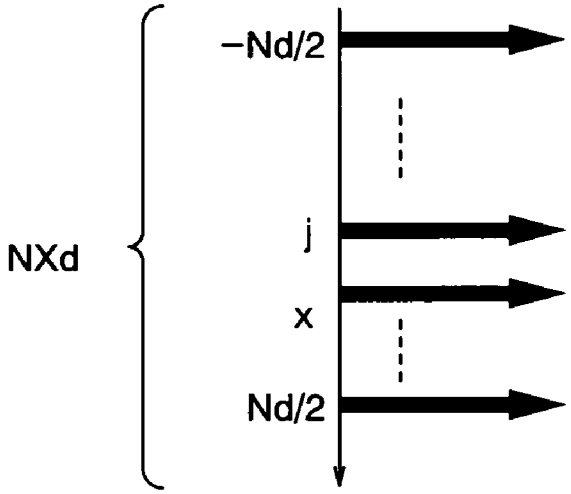
FIG. 8A and FIG. 8B are a schematic diagram showing propagation of beams before a change of a beam scanning direction and propagation of the beams after the change of the beam scanning direction when the beams are assumed to be radiated from a continuous plane in the optical control type phased array antenna according to Embodiment 3 of the present invention.
Figure 8B:
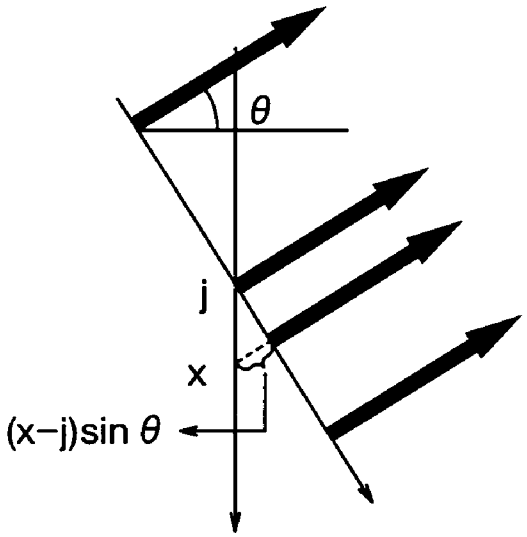

The axis of coordinates is set as shown in FIG. 8A and FIG. 8B, and it is supposed that a position j corresponds to a central axis of rotation during the beam scanning. In addition, it is supposed that the beams are propagated in a state where the intensities of the signal lights are uniform in the azimuth angle direction. At this time, an optical path length difference on a radiation plane with respect to the position j when the beam scanning direction is changed by the angle θ is given by Equation (3):

$$\left|\int_{-Nd/2}^{Nd/2}\{(x-j)\sin\theta\}dx\right| = jNd\sin\theta \tag{3}$$

Thus, in order that the optical path length difference may become minimum, a position 0 (a center of a beam radiating surface) has to be made the central axis of rotation during the beam scanning. In addition, a phase difference caused by the optical path length difference expressed by Equation (3) can be corrected using the PLL.

As described above, the optical control type phased array antenna according to Embodiment 4 of the present invention has an advantage that it becomes possible to suppress the phase noise caused when the antenna pattern is changed in the spatial optical phase modulating means 7.

Note that while in Embodiment 3, there are some portions using the optical fiber as the optical transmission means, the transmission means is not especially limited thereto in the present invention.

Embodiment 4

Figure 9:
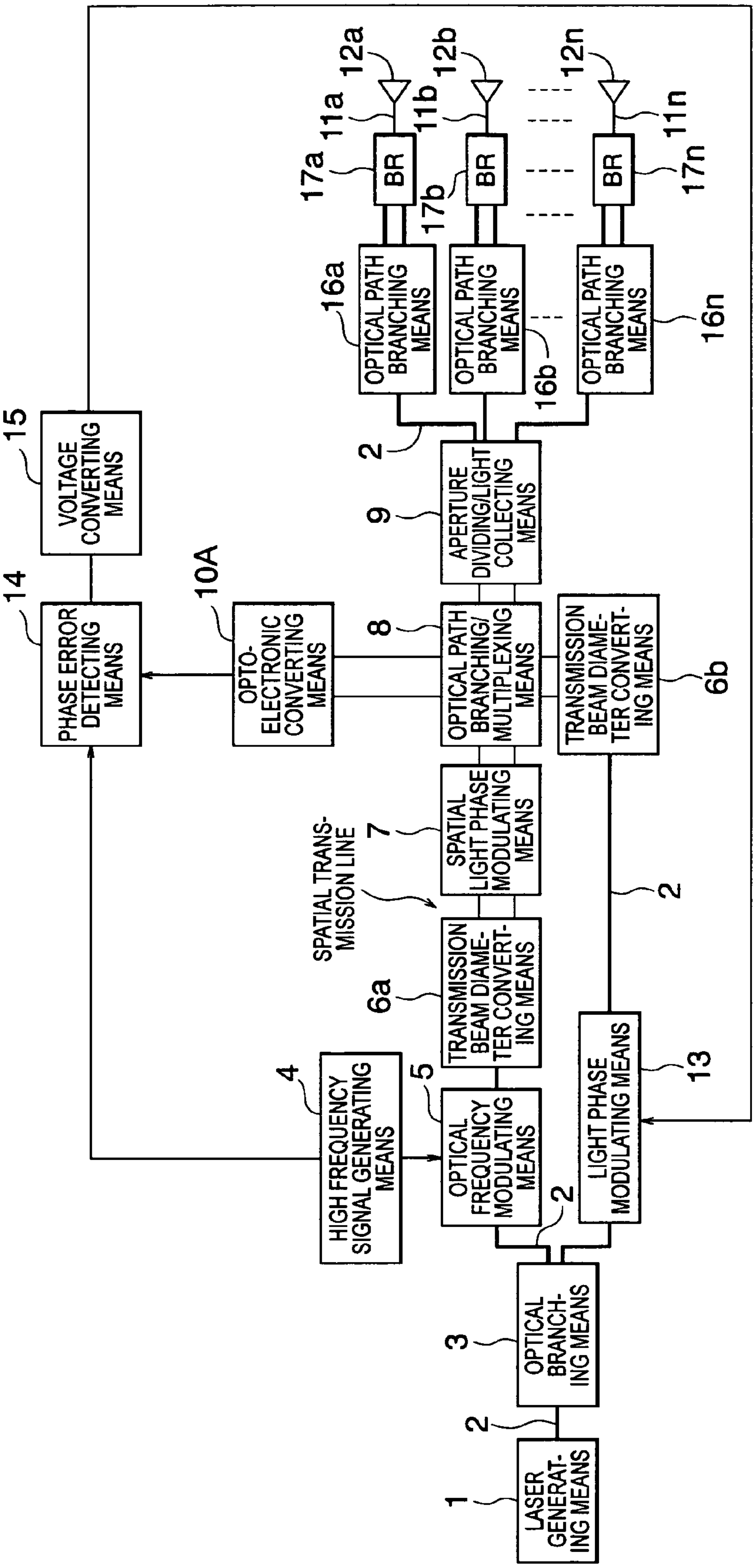
FIG. 9 is a block diagram showing a configuration of an optical control type phased array antenna according to Embodiment 4 of the present invention.

An optical control type phased array antenna according to Embodiment 4 of the present invention will hereinafter be described with reference to the corresponding drawings. FIG. 9 is a block diagram showing a configuration of the optical control type phased array antenna according to Embodiment 4 of the present invention.

Embodiments 1 to 3 described above adopt the system in which the phase noise of the light source itself is suppressed, the system in which the phase noise caused by the disturbance of the space is suppressed, and the system in which the phase noise caused by the change of the antenna pattern is suppressed, respectively. Moreover, the relative intensity noise is considered as the cause of the SNR degradation during the reception in the heterodyne detection. In Embodiment 4, balanced receiver means is used as measures to solve that problem in the optoelectronic converting means 10*a* to 10*n* in order to realize the suppression of the relative intensity noise of the light source.

In FIG. 9, the same constituent elements as those in FIGS. 1 and 4 are designated with the same reference symbols, and their descriptions are omitted here.

The optical control type phased array antenna according to Embodiment 4 of the present invention further includes optical path branching means 16*a* to 16*n* for branching the transmission light transmitted through the optical fiber type transmission means 2 into two transmission lights, and balanced receiver means (BR) 17*a* to 17*n*.

Next, the principles of the suppression of the relative intensity noise using the balanced receiver means (BR) will be described.

Momentary electric fields of the signal light and the local light in the heterodyne detection are expressed by Equations (4) and (5), respectively:

$$S(t)=\sqrt{2P_S}\{1+m_S\cos(\Omega_S t+\theta_S)\}e^{j(\omega_S t+\Phi_S)} \tag{4}$$

$$L(t)=\sqrt{2P_L}\{1+m_L\cos(\Omega_L t+\theta_L)\}e^{j(\omega_L t+\Phi_L)} \tag{5}$$

$P_S$ and $P_L$ each represent electric powers of the signal light and the local light, $\omega_S$ and $\omega_L$ each represent angular frequencies of the signal light and the local light, and $\Phi_S$ and $\Phi_L$ each represent phases of the signal light and the local light. In addition, it is supposed that the signal light and the local light have relative intensity noises which are expressed by angular frequencies $\Omega_S$ and $\Omega_L$, modulation factors $m_S$ and $m_L$, and phases $\theta_S$ and $\theta_L$, respectively. When an electric power branching ratio of the optical path branching means inserted in front of the balanced receiver means (BR) is assigned $\epsilon$, a propagation constant of the signal light is assigned $\beta_S$, a propagation constant of the local light is assigned $\beta_L$, and a propagation constant of the emitted light after the emitted light passes through the optical path branching means is assigned $\beta_N$, optoelectronic fields $E_1(t)$ and $E_2(t)$ which are made incident to photodiodes $PD_1$ and $PD_2$ provided inside the balanced receiver means (BR) are expressed by Equations (6) and (7), respectively:

$$E_1(t)=\sqrt{\epsilon}S(t)+\sqrt{(1-\epsilon)}L(t)e^{j\pi/2} \tag{6}$$

$$E_2(t)=\{\sqrt{(1-\epsilon)}S(t)e^{j\beta_S\Delta z}e^{j\pi/2}+\sqrt{\epsilon}L(t)e^{j\beta_L\Delta z}\}e^{j\beta_N\Delta z} \tag{7}$$

In Equations (6) and (7), it is assumed that an optical path length of the optoelectronic field $E_2(t)$ made incident to the photodiode $PD_2$ is longer than that of the optoelectronic field $E_1(t)$ made incident to the photodiode $PD_1$ by $\Delta z$. Optoelectronic currents $I_1(t)$ and $I_2(t)$ which are generated when those optoelectronic fields are made incident to the photodiodes $PD_1$ and $PD_2$ are given by Equations (8) and (9), respectively:

$$\begin{aligned} I_1(t) = (\eta_1 e/h\nu)\times &\{\varepsilon P_S[1+m_S\cos(\Omega_S t+\theta_S)] + (1-\varepsilon)P_L[1+m_L\cos(\Omega_L t+\theta_L)] + \\ &2\sqrt{\varepsilon(1-\varepsilon)P_S P_L[1+m_S\cos(\Omega_S t+\theta_S)][1+m_L\cos(\Omega_L t+\theta_L)]} \\ &\sin[(\omega_S-\omega_L)t+\phi_S-\phi_L]\} + n_1(t) \end{aligned} \tag{8}$$

$$\begin{aligned} I_2(t) = (\eta_2 e/h\nu)\times &\{(1-\varepsilon)P_S[1+m_S\cos(\Omega_S t+\theta_S)] + \\ &\varepsilon P_L[1+m_L\cos(\Omega_L t+\theta_L+\beta_N\Delta z)] + 2 \\ &\sqrt{\varepsilon(1-\varepsilon)P_S P_L[1+m_S\cos(\Omega_S t+\theta_S)][1+m_L\cos(\Omega_L t+\theta_L+\beta_N\Delta z)]} \\ &\sin[(\omega_S-\omega_L)t+\phi_S-\phi_L+(\beta_S-\beta_L)\Delta z]\} + n_2(t) \end{aligned} \tag{9}$$

Each of $n_1(t)$ and $n_2(t)$ represents a sum of a shot noise and a thermal noise, $\eta_1$ and $\eta_2$ represent quantum efficiencies of the photodiodes $PD_1$ and $PD_2$, respectively, e represents an electron charge, and h represents a Plank's constant.

A differential output obtained between the two photodiodes $PD_1$ and $PD_2$ is expressed as follows:

$$I_1(t)-I_2(t)=I_{DC}(t)+I_{IF}(t) \tag{10}$$

$I_{DC}(t)$ represents a DC component of an optoelectronic current, and $I_{IF}(t)$ represents an intermediate frequency component. At this time, $I_{DC}(t)$ is expressed as follows:

$$\begin{aligned} I_{DC}(t) = (e/h\nu)\{&\eta_1\varepsilon P_S[1+m_S\cos(\Omega_S t+\theta_S)] - \\ &\eta_2(1-\varepsilon)P_S[1+m_S\cos(\Omega_S t+\theta_S)] + \\ &\eta_1(1-\varepsilon)P_L[1+m_L\cos(\Omega_L t+\theta_L)] + \\ &\eta_2\varepsilon P_L[1+m_L\cos(\Omega_L t+\theta_L+\beta_N\Delta z)]\} \end{aligned} \tag{11}$$

A case where there is no dispersion in all the parameters, that is, a case where the quantum efficiencies $\eta_1$ and $\eta_2$ are each equal to $\eta$, the electric power branching ratio $\epsilon=0.5$, and $\Delta z=0$ is considered below. At this time, when a time fluctuation component of $I_{DC}(t)$ is judged to be a relative intensity noise component, and thus is expressed by $I_N(t)$, Equation (12) is obtained and thus the relative intensity noise is perfectly canceled.

$$\begin{aligned} I_N(t) &= (e/h\nu)\{0.5\eta P_S[1+m_S\cos(\Omega_S t+\theta_S)] - \\ &\quad 0.5\eta P_S[1+m_S\cos(\Omega_S t+\theta_S)] + \\ &\quad 0.5\eta P_L[1+m_L\cos(\Omega_L t+\theta_L)] - \\ &\quad 0.5\eta P_L[1+m_L\cos(\Omega_L t+\theta_L)]\} \\ &= 0 \end{aligned} \tag{12}$$

In addition, the measurements of the suppression of the relative intensity noise by the balanced receiver means (BR) were carried out using the experimental system of FIG. 2 shown in Embodiment 1.

Figure 10A:
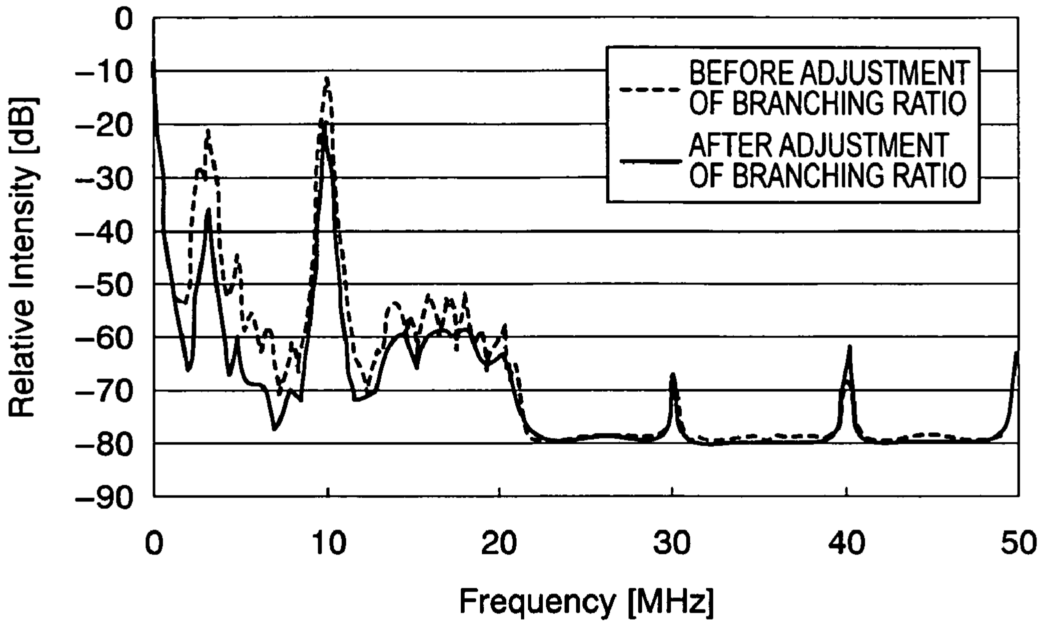
FIG. 10A and FIG. 10B are a graphical representation showing output spectra when suppression of a relative intensity noise is measured by balanced receiver means using the experimental system of FIG. 2.
Figure 10B:
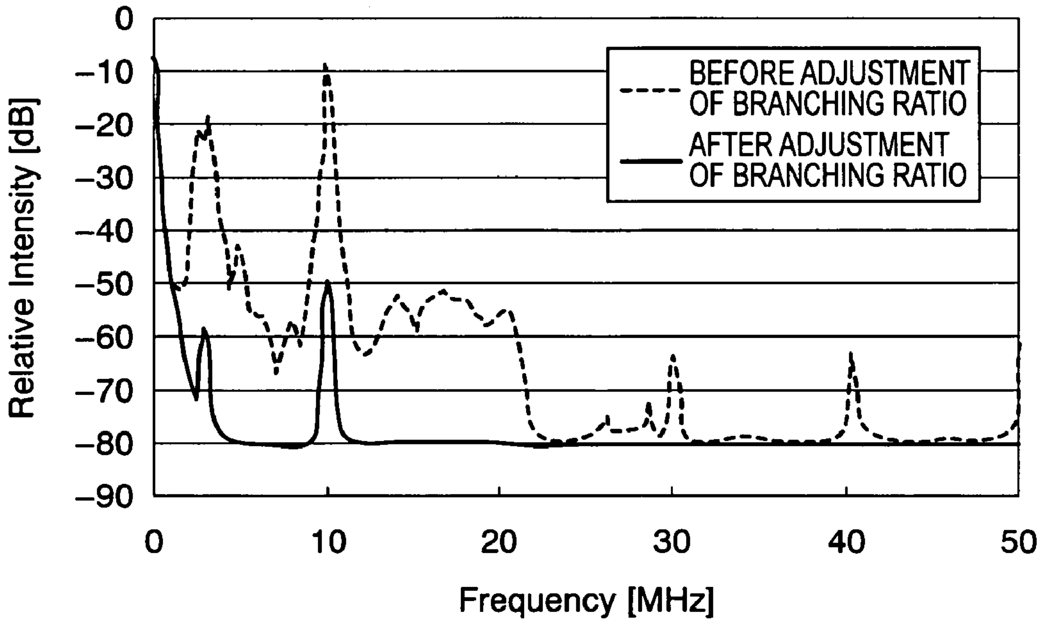

FIGS. 10A and 10B show output spectra. FIG. 10A shows the output spectrum before an adjustment of the branching ratio and the output spectrum after the adjustment of the branching ratio when the optical path lengths of the two paths each extending from the variable coupler 109 to the balanced receiver means (BR) 110 are different from each other. Also, FIG. 10B shows the output spectrum before the adjustment of the branching ratio and the output spectrum after the adjustment of the branching ratio when the optical path lengths of the two paths each extending from the variable coupler 109 to the balanced receiver means (BR) 110 are equalized. FIGS. 10A and 10B prove that while an increase in SNR by the branching ratio adjustment ($\epsilon$=0.5) when the optical path lengths are different from each other is about 7 dB, an increase in SNR by the branching ratio adjustment ($\epsilon$=0.5) when the optical path lengths are equalized is about 39 dB. Thus, it could be proved that the setting of the electric power branching ratio of $\epsilon$=0.5 and the equalization of the optical path lengths are simultaneously carried out, thereby allowing the relative intensity noise to be greatly suppressed.

Consequently, with the configuration using the balanced receiver means (BR) as the optoelectronic converting means, the optical control type phased array antenna (PAA) has a following advantage. That is, the electric powers of the two incident lights made incident to the balanced receiver means (BR) are equalized, and the optical path lengths of the two incident lights from the optical path branching means, in which the transmission light is branched, to the photodiodes $PD_1$ and $PD_2$, to which the two incident lights are made incident, are also equalized, whereby it is possible to suppress the relative intensity noise of the light source.

Note that while in Embodiment 4, there are some portions in each of which the optical fiber is used as the optical transmission means, the transmission means is not especially limited thereto in the present invention.

INDUSTRIAL APPLICABILITY

In the optical control type phased array antenna according to the present invention, as described above, the optical path lengths of the two paths of the signal light and the local light between the optical path branching means and the optical path branching/multiplexing means are equalized, whereby the phase noise caused by the phase fluctuation of the light source itself can be suppressed, and hence the request for the line width of the light source can be largely relaxed. Consequently, the present invention can be applied to a radio application apparatus such as a radar apparatus.

The invention claimed is:

1. An optical control type phased array antenna, comprising:

laser generating means for generating a light having a single wavelength;

optical path branching means for branching the emitted light from the laser generating means into first and second transmission lights;

high frequency signal generating means for generating a high frequency signal;

optical frequency modulating means for shifting a frequency of the first transmission light obtained through the branching by the optical path branching means by a frequency of the generated high frequency signal;

spatial light phase modulating means for carrying out spatial phase modulation corresponding to an antenna beam pattern for the first transmission light having the frequency shifted by the frequency of the generated high frequency signal;

optical path branching/multiplexing means for multiplexing the first transmission light subjected to the phase modulation and the second transmission light obtained through the branching by the optical path branching means;

aperture dividing/light collecting means for dividing one transmission light obtained through the branching of the transmission light obtained through the multiplexing by the optical path branching/multiplexing means into a plurality of transmission lights;

a plurality of optoelectronic converting means for converting light intensities of the plurality of pairs of transmission lights into electrical signals, respectively; and a plurality of element antennas for radiating the electrical signals from the plurality of optoelectronic converting means as beams, respectively, wherein optical path lengths of two paths between the optical path branching means and the optical path branching/multiplexing means are equalized.

2. An optical control type phased array antenna according to claim 1, further comprising:

second optoelectronic converting means for converting a light intensity of a transmission light obtained through branching of the transmission light obtained through the multiplexing by the optical path branching/multiplexing means into an electrical signal;

phase error detecting means for detecting a phase difference between the electrical signal generated by the high frequency signal generating means and the electrical signal from the second optoelectronic converting means; and optical phase modulating means for modulating a phase of one of the first and second transmission light obtained through the branching by the optical path branching means based on the phase difference detected by the phase error detecting means.

3. An optical control type phased array antenna according to claim 2, further comprising voltage converting means for converting a first voltage signal corresponding to the phase difference detected by the phase error detecting means into a second voltage signal, wherein the optical phase modulating means modulates the phase of one of the first and second transmission light obtained through the branching by the optical path branching means in correspondence to the second voltage signal.

4. An optical control type phased array antenna, comprising:

laser generating means for generating a light having a single wavelength;

optical path branching means for branching the emitted light from the laser generating means into first and second transmission lights;

high frequency signal generating means for generating a high frequency signal;

optical frequency modulating means for shifting a frequency of the first transmission light obtained through the branching by the optical path branching means by a frequency of the generated high frequency signal;

spatial light phase modulating means for carrying out spatial phase modulation corresponding to an antenna beam pattern for the first transmission light having the frequency shifted by the frequency of the generated high frequency signal;

optical path branching/multiplexing means for multiplexing the first transmission light subjected to the phase modulation and the second transmission light obtained through the branching by the optical path branching means;

aperture dividing/light collecting means for dividing one transmission light obtained through the branching of the transmission light obtained through the multiplexing by the optical path branching/multiplexing means into a plurality of transmission lights;

a plurality of second optical path branching means for two-branching the plurality of transmission lights obtained through the division by the aperture dividing/light collecting means, respectively;

a plurality of balanced receiver means for converting light intensities of the plurality of pairs of branching transmission lights into electrical signals, respectively, for every pair of transmission lights obtained through the two-branching;

a plurality of element antennas for radiating the electrical signals from the plurality of balanced receiver means as beams, respectively;

optoelectronic converting means for converting a light intensity of the other transmission light obtained through the branching of the transmission light obtained through the multiplexing by the optical path branching/multiplexing means into an electrical signal;

phase error detecting means for detecting a phase difference between the electrical signal generated from the high frequency signal generating means and the electrical signal from the optoelectronic converting means; and light phase modulating means for modulating a phase of one of the first and second transmission light obtained through the branching by the optical path branching means based on the phase difference detected by the phase error detecting means, wherein optical path lengths of two paths between the optical path branching means and the optical path branching/multiplexing means are equalized.

* * * * *